Figure 1:
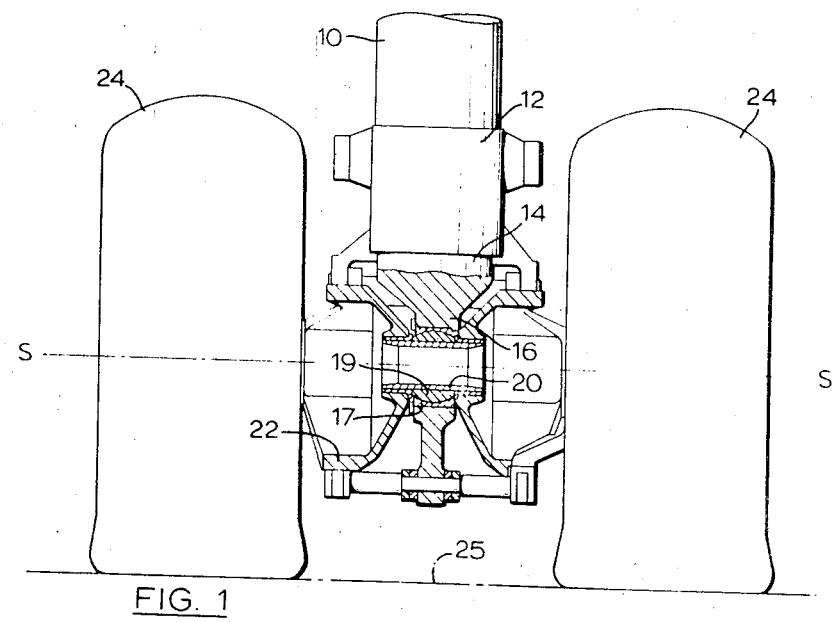

United States Patent [19]
Stratford

[11] 3,784,131
[45] Jan. 8, 1974

[54] AIRCRAFT LANDING GEAR

[76] Inventor: Henry Ralph Stratford, 337 Fairview Dr., Whitby, Ontario, Canada

[22] Filed: May 19, 1972

[21] Appl. No.: 255,096

[52] U.S. Cl. ................. 244/102 R, 280/104.5 A
[51] Int. Cl. ............................................. B64c 25/58
[58] Field of Search ............ 244/50, 104 R, 104 CS, 244/104 FP, 102 R, 100 R, 103 R; 188/321; 280/104.5 R, 104.5 A, 112 A, 112 R

[56] References Cited
UNITED STATES PATENTS
| | | | |
|---|---|---|---|
| 1,802,692 | 4/1931 | Zindel | 244/104 CS |
| 1,546,894 | 7/1925 | Hauck | 188/321 X |

FOREIGN PATENTS OR APPLICATIONS
| | | | |
|---|---|---|---|
| 1,018,918 | 1/1953 | France | 244/102 R |
| 987,944 | 8/1951 | France | 244/102 R |

*Primary Examiner*—Trygve M. Blix
*Assistant Examiner*—Paul E. Sauberer
*Attorney*—Peter W. McBurney et al.

[57] ABSTRACT

This invention provides an aircraft landing gear in which a bogie axle is mounted horizontally in bearing means at the bottom of a vertical strut which incorporates a shock absorber cylinder. The bogie beam extends in either direction from the bearing means and the latter is constructed for minimal resistance to rolling movement, preferably by incorporating a spherical bearing surface. Resistance to rolling movement is provided by two torque linkages extending between the vertical strut above the shock absorber piston and the ends of the bogie beam.

4 Claims, 2 Drawing Figures

PATENTED JAN 8 1974 3,784,131

AIRCRAFT LANDING GEAR

This invention relates to aircraft landing gear, and has to do particularly with bogie landing gear, in which a bogie beam carrying an axle and one or more wheels at both its fore and aft extremity is coupled to the lower member of a substantially vertical telescopic shock absorbing strut at approximately the mid-point of the bogie beam.

In conventional practice the bogie-to-strut coupling has been of the form to permit the essential pitching freedom (i.e., about a lateral axis), and to restrain the tendency for relative rolling movement (i.e., around a fore/aft axis), thus transmitting the majority of any prevailing rolling moment from the bogie beam to the strut through the coupling between these two.

The telescopic nature of the shock absorber strut is such that means must be provided to restrain the tendency for the lower member (to which the bogie beam is connected) to turn relative to the upper end of the strut under the action of yawing moments (i.e. about the axis of the shock absorbing strut, which is usually vertically oriented). This restraining means usually takes the form of external linkage which in some cases bridges not only the telescopic motion of the strut, but also the pitching motion of the bogie beam relative to the strut. In these instances, the lower linkage of the restraining means is coupled directly to the bogie assembly rather than to the lower telescopic member of the strut, thus relieving the bogie-to-strut coupling of any yaw moments. The upper link member of the restraining means is coupled to the upper member of the telescopic strut.

Maximum yawing moments of bogie type landing gears are inherently much greater than those for single axis landing gears, and thus the linkage transmitting these moments must be quite substantial, and for this reason there is sometimes provided a double set of links: one forward of the strut and another aft of the strut.

The essence of this invention is the realization that, when such a double linkage fore and aft of the strut connects the bogie assembly directly to the upper telescopic member, it is able to serve both its normal function of transmitting yaw moment, and in addition the further function of transmitting a roll moment that would otherwise be transmitted via the bogie-to-strut primary coupling.

Thus, when carrying out this invention, no additional linkage or mechanism is added to conventional structure. Rather, the bogie-to-strut coupling is constructed in such a way as to eliminate its conventional capability of transmitting rolling moment, thereby automatically transferring this rolling moment to the linkage conventionally provided to resist the yawing moment. By utilizing the relatively standard linkage to serve this double purpose, considerable weight and space economy can be effected in the coupling.

This weight and space saving in the primary bogie-to-strut coupling is the basic advantage of this invention. Among the other benefits emanating directly from the basic advantage, the most valuable one is probably the ability to locate the functional elements of the shock absorber closer to the bogie beam, and thus enhance the working context of the shock absorber, and afford greater opportunity to optimize the supporting structure.

Figure 2:
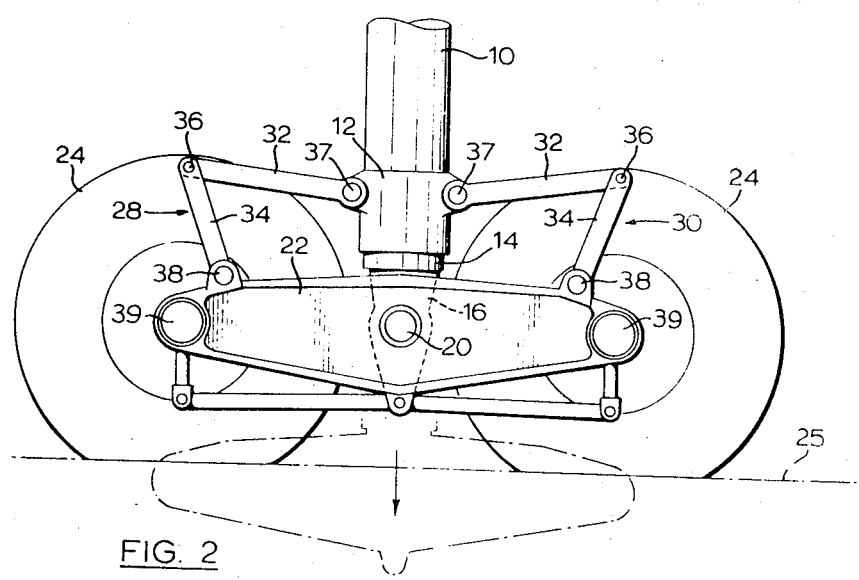

One embodiment of this invention is shown in the accompanying drawings, in which like numerals denote like parts throughout the several views, and in which:

FIG. 1 is a partial sectional view taken along a vertical plane containing the bogie-to-strut axis; and FIG. 2 is a side elevational view of the strut and bogie beam, from which the nearer pair of wheels has been removed in order to show the mechanical components.

Turning first to FIG. 1, a vertical strut 10 incorporates at its lower end a shock absorber cylinder 12 within which a shock absorber piston 14 is adapted vertically to reciprocate. The piston 14 reduces to a narrower dimension at 16, where it supports a spherical bearing seat 17. Mounted within the spherical bearing seat 17 is a spherical bearing 19 within which is axially mounted an axle 20 about which a bogie beam 22 is adapted to pivot (about the axis S—S). The portion of the bogie beam 22 on the remote side of the plane along which the section is taken in FIG. 1 is shown as supporting two wheels 24 which bear against the surface 25 of the airstrip.

Attention is now directed to FIG. 2, where the bogie beam 22 is shown in elevation. A forward torque linkage 28 and an aft torque linkage 30 are provided, and serve the conventional purpose of countering yaw moments which arise when the aircraft turns while taxiing, and which try to rotate the piston 14 with respect to the cylinder 12. The two torque linkages 28 and 30 are identical, and each consists of an upper V-link 32 and a lower V-link 34. The apex of each upper V-link 32 is pivotally connected to the apex of its respective lower V-link 34 as shown at 36. The two arms of each upper V-link 32 are pivoted at 37 to the cylinder 12, and the two arms of each lower V-link 34 are pivoted to the bogie beam 22 as shown at 38.

Because of the spherical nature of the bearing 19 and its associated bearing seat 17, it will be appreciated that, in the absence of any restraint imposed by the torque linkages 28 and 30, the bogie beam 22 would be free to pitch, yaw and roll, encountering only those frictional restraining forces arising between the bearing 19 and the bearing seat 17. Provision of the torque linkages 28 and 30, however, fulfils the conventional purpose of resisting yawing movement of the bogie beam 22 with respect to the vertical strut 10, and additionally restrains rolling movement of the bogie beam 22. It is to be pointed out that, whereas a single torque linkage would suffice to resist yawing movement, it is necessary to provide two torque linkages, one fore and one aft of the vertical strut 10, in order to successfully resist both rolling and yawing movement. As in conventional landing gear constructions, the torque linkages 28 and 30 permit pitching movement of the bogie beam 22 with respect to the vertical strut 10, and of course permit vertical translation movement of the bogie beam 22 as the piston 14 reciprocates within the cylinder 12 of the shock absorber.

Thus, the essence of this invention is the realization that, in conventional bogie landing gears which utilize two torque linkages, one fore and one aft of the strut, it is possible to reduce the size of the bogie-to-strut joint so that little if any rolling moment is transmitted through the joint, whereby most or all of the rolling moment will be transferred to the torque linkages which will effectively resist the rolling moment.

It is pointed out that, although a spherical bearing has been shown between the bogie beam 22 and the piston 14, this construction does not form an essential part of this invention. It is true that the spherical bearing is likely to permit more of the rolling moment to be transferred through the torque linkages 28 and 30, but those familiar with the field will appreciate that a cylindrical bearing appropriately dimensioned would also permit most of the rolling moment to be resisted by the torque linkages 28 and 30.

What I claim is:

1. An aircraft landing gear, comprising:
   a substantially vertical strut incorporating at its lower end a shock absorber cylinder,
   a shock absorber piston in said shock absorber cylinder adapted for reciprocal movement therewithin,
   a bogie axle mounted horizontally in bearing means in said shock absorber piston,
   a bogie beam mounted on said bogie axle at a location intermediate the ends of the bogie beam,
   wheel means mounted at either end of the bogie beam,
   a first torque linkage consisting of a first upper V-link and a first lower V-link pivotally joined together at their apices, the first upper V-link having its base pivoted to said strut, the first lower V-link having its base pivoted to the bogie beam at a point intermediate said location and one end of the bogie beam,
   a second torque linkage consisting of a second upper V-link and a second lower V-link pivotally joined together at their apices, the second upper V-link having its base pivoted to said strut, the second lower V-link having its base pivoted to the bogie beam at a point intermediate said location and the other end of the bogie beam,
   said bearing means having insufficient roll-resistant strength to resist by itself the normal rolling movement of the bogie beam about a roll axis extending longitudinally of the bogie beam, whereby the major resistance to such rolling movement is provided by the first and second torque linkages.

2. An aircraft landing gear as claimed in claim 1, in which said bearing means comprises a bearing seat fixed to the shock absorber piston and defining a spherical bearing surface, the bogie axle having a spherical bearing seated against said spherical bearing surface.

3. An aircraft landing gear as claimed in claim 2, in which said wheel means consists of two wheel axles, one at either end of the bogie beam, each wheel axle supporting two wheels.

4. An aircraft landing gear as claimed in claim 3, in which the dimension of said bearing means in the longitudinal direction of the bogie axle is small compared with the dimension through the shock absorber piston.

* * * * *